May 9, 1967     F. E. CARIOU ET AL     3,319,141

THIN FILM CAPACITORS

Original Filed Dec. 27, 1962

- Coated Metal
- A Poly(p-xylylene) Dielectric Film
- Metal Substrate

*INVENTORS*
FRANK E. CARIOU
WILLIAM E. LOEB
DAVID J. VALLEY

BY Leo A. Plumb

*ATTORNEY*

3,319,141
THIN FILM CAPACITORS

Frank E. Cariou, Cleveland, Ohio, William E. Loeb, Martinsville, N.J., and David J. Valley, Cleveland, Ohio, assignors to Union Carbide Corporation, a corporation of New York
Original application Dec. 27, 1962, Ser. No. 247,557. Divided and this application June 7, 1965, Ser. No. 487,943
13 Claims. (Cl. 317—258)

This application is a division of application Ser. No. 247,557, filed Dec. 27, 1962.

This invention relates to thin film capacitors. More particularly, this invention relates to an electrical capacitor element in thin films comprising a laminate of vapor-deposited poly(p-xylylene) and a conductive metal layer in alternatively deposited form, and to methods for making the same.

Heretofore, capacitors employed in electrical circuitry have been limited to certain forms of constructions of metal discs, foils or films separated by insulative films, and to certain compounds and compositions capable of storing and retaining electric current charges without leakage of the current charge through the dielectric. Capacitors made from thin aluminum foils separated by insulative plastics or resin impregnated materials of high dielectric strength have been most widely employed for such applications, although certain other rare metal compounds and compositions have recently found similar applications in electrical circuitry. With the advent of miniaturized and microminiaturized electric circuitry, however, there is need for reducing the effective size of certain elements, particularly the capacitors, resistors, and other bulky elements of amplification, rectification and attenuation circuits. Other than inorganic dielectrics such as mica and silicon oxide, presently available materials of construction are not suitable for constructing thin film microminiaturized capacitors. In fact, in many amplification, attenuation and rectification circuits, the resistors and capacitors have proven to be the bulkiest of the components, even greater in size by many times than the transistors and diodes employed therein.

Figure 1:
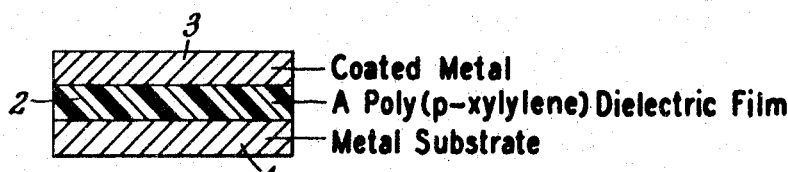
FIGURE 1 is a longitudinal sectional view of a simple laminar capacitor made in accordance with this invention.

According to the present invention, it has now been discovered that thin film capacitors can now be prepared by forming an alternate laminate of at least two electrically conductive metal layers separated by a vapor-deposited solid poly(p-xylylene) integrally bonded to at least one of the conductive metal layers. These alternate laminates, as hereinafter more fully described, provide capacitors having a virtually stable capacitance regardless of frequency, have low dissipation factors, have a temperature coefficient of capacitance which has little variation over a wide range of temperature or frequency, and which are otherwise superior or equivalent to that of foil capacitors now available but which can be prepared in very thin units built up on an insulative support, or thick self-supporting films having any desired thickness. The most useful and practical benefits of this invention are served with such thin film in microminiaturized circuits which could not heretofore be made.

As another aspect of this invention, there is provided a method for the formation of capacitor elements adapted to retain and store electrical charges and having a wide range of selected or desired capacitance which comprises the steps of forming a metal-polymer laminate by condensing and depositing from the vapor state, a vaporous reactive p-xylylene diradical onto a conductive metal substrate cooled to a temperature below the condensation temperature of the p-xylylene diradical to build up a void-free coating thereon of at least 100 A. units thereon. Condensation of these reactive diradicals on any surface below the ceiling condensation temperature of the reactive diradical causes the nearly instantaneous polymerization of the diradical into a linear thermoplastic poly(p-xylylene) in thin films. Pin-hole free films of the poly(p-xylylene) are secured in a thickness of about 100 A. units and greater, thereby making possible very thin capacitors, if such are desired, or capacitors in which the dielectric film is any selected or desired thickness, even up to as high as 1–2 mils (250,000–500,000 A.) if such are desired. However, the most unique features of these capacitors are realized in the ultra thin films of 100–10,000 A. units.

By this technique, it is possible to deposit and polymerize the reactive diradicals onto a conductive metal foil as a dielectric and thus build up a laminate of foils as the capacitor, or alternatively, to deposit a conductive metal film onto a formed poly(p-xylylene) by the alternate lamination of poly(p-xylylene) and metal so as to build up capacitive elements and structures on supports or to construct thicker self-supporting film structures having extremely high capacitance even though physically of small size or area.

Thus it is within the concept of the present invention to deposit by vacuum techniques a linear poly(p-xylylene) onto a thin metal conducting foil or wire and subsequently to build up alternating layers of metal and polymer until the desired thickness of the capacitor element is built up, or the desired degree of capacitance is secured. It is also within the concept of this invention to vacuum evaporate and vapor deposit a metal film on the polymer coated foil or wire and to attach leads to the metal substrate and to the vapor deposited metal film. It is possible to build up as many alternate coatings as desired, providing during the deposition, leads are made to alternate vapor deposited metal films by masking or other suitable techniques.

It is also within the concept of this invention to deposit a thin metal film by vapor technique onto a thin plastic web or other suitable insulative substrate and subsequently to build up alternating layers of polymer and metal until the desired thickness of the capacitor element is built up or the desired degree of capacitance is secured.

Such elements can be employed as planar capacitors or can be wound up and used as a rolled capacitor, if the substrate is thin and flexible.

Figure 2:
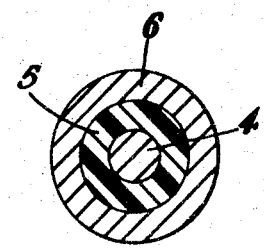
FIGURE 2 is a longitudinal sectional view of a cylindrical capacitor made in accordance with this invention.
Figure 3:
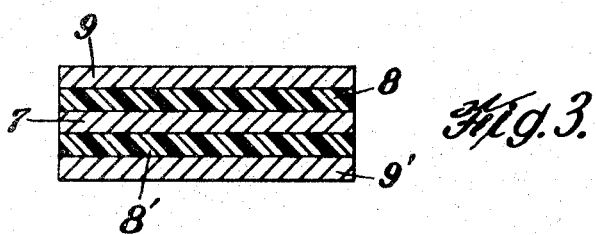
FIGURE 3 is a longitudinal sectional view of a laminated capacitor made in accordance with this invention having a multiplicity of conductive, metallic layers separated by layers of dielectric film.
Figure 4:
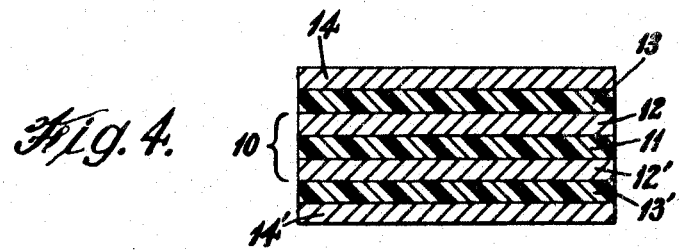
FIGURE 4 is a longitudinal sectional view of a laminated capacitor made in accordance with this invention in which the metal substrate consists of a self-supporting polymeric film coated on both sides thereof with conductive metallic films.
Figure 5:
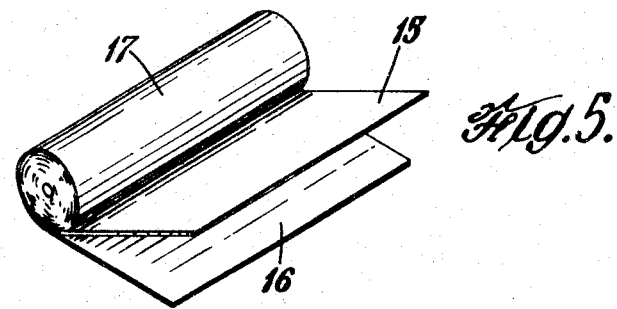
FIGURE 5 shows a partially unwound capacitor element consisting of two convolutely wound strips of metal foil coated on each side thereof with a dielectric film of a poly(p-xylylene) made in accordance with this invention.

FIGURE 1 shows the simplest embodiment of the present invention which consists of a metal substrate 1 coated on one side only with a pin-hole or void free, linear, polymeric film 2 of a poly(p-xylylene) resin which is integrally bonded to metal substrate 1. A coating of metal 3 is then applied to the dielectric film 2 in order to produce a capacitor. Naturally, the metal substrate 1 can have a dielectric film applied to both sides thereof. FIGURE 2 shows a cross-sectional view of another embodiment of the present invention. It consists of a wire 4 (the metallic substrate) which is coated with a dielectric film 3 of a poly(p-xylylene). A metal coating 6 completes the cylindrical shaped capacitor. FIGURE 3 shows in cross-sectional view a laminated capacitor made in accordance with this invention. It consists of a metal substrate 7, such as aluminum foil coated on both sides thereof with a poly(p-xylylene) dielectric film 8 and 8'. As before, in order to complete the capacitor, the dielectric film is then coated on each side with a metallic film 9 and 9'. FIGURE 4 shows still another embodiment of the present invention which consists of a capacitor wherein the metal substrate 10 is composed of a self-supporting plastic film 11, such as a self-supporting film of poly(p-xylylene), coated on both sides thereof with a film of metal 12 and 12'. These may be vapor deposited metallic films. The flexible metal substrate 10 is coated on each side thereof with a dielectric film 13 and 13' of a poly(p-xylylene) resin. The dielectric films 13 and 13' may then be coated again with metallic coatings 14 and 14' to complete the capacitor. FIGURE 5 discloses a preferred embodiment of the present invention. This consists of a rolled foil capacitor element 17. Capacitor element 17 is made by convolutely winding two strips 15 and 16 each of which consists of a strip of metal foil coated on each side thereof, in accordance with this invention, with a void free, linear film of a poly(p-xylylene) resin at least 100 A. thick, the film being integrally bonded to said metal foil substrate. The wound capacitor element 17 after having appropriate leads attached, and being encased in a suitable container constitutes a rolled foil capacitor. In each of the instances described above the dielectric film of the poly(p-xylylene) resin serves to electrically isolate the conductive metal films from each other.

Generally in the practice of this aspect of the present invention, the vapor deposited conductive metal film should be of sufficient thickness so that there is complete conduction of electrical charges throughout the entire surface of metal film and thus avoid the deposition of islands of metal not interconnected with each other. This can be achieved readily at thicknesses of 1000 A., and when care is employed in assuring a clean substrate and using certain pure metals for deposition, vapor deposited metal films as thin as 100 A. can be secured. Certain metals such as chromium, aluminum and lead tend to deposit as very thin, completely conducting films whereas others tend to agglomerate on deposition to give islands of metal and thus require a somewhat thicker coat. Zinc, silver, gold and cadmium tend to be in this class and will form islands of metal which must be interconnected before electrical conduction takes place. Hence thicker films may be required for certain of these metals.

Best results have been found in those metal films having a thickness of 500 to 5000 A. Thicker film can be used but in multilayer capacitors some have a tendency to pull apart at the metal layer or to strip off the substrate since the vapor deposited metal layer has little mechanical strength. However, for many end uses, this is not critical and may be disadvantageous.

A distinct and unique advantage of this metal vapor deposition technique is the self-healing power of capacitors made thereby. Any electrical breakthrough or arcing through the dielectric can be removed by a current surge to burn through the thin vapor deposited metal film and thus remove it from the area of breakthrough. Hence continued arcing or shorting of such capacitors is avoided or at least reduced to a rarity.

While the vapor deposition of metal to form the conducting metal layer of the capacitors of the present invention is preferred for most thin film applications and for integrated circuits, it is also possible to employ metal foil as one or more of the conducting metal layers. For example, a preferred type of capacitor, either in planar or rolled type is that consisting of a metal foil coated on at least one side with a poly-p-xylylene and that in turn is coated with a conducting layer of vapor deposited metal, with leads attached to both of the metal films. This capacitive structure possesses the distinct advantage of having the conductive surfaces and the dielectric firmly bonded to each other without air entrapment in the dielectric or a chance for liquid or vapor to penetrate between the dielectric and conducting films and thus change or cause variation in capacitance.

It is not critical in this invention what particular metal is employed other than it should be normally solid and naturally conductive to the passage of electric charges. While any conductive metal can be used, it is generally preferred that the metal be an excellent natural conductor in the solid state, i.e. has a bulk resistivity less than 100 $\mu$ohm centimeters and more preferably less than 10 $\mu$ohm centimeters, such as for example gold, silver, copper, aluminum, lead and selenium, since there is low ohmic loss due to resistance of the metal in the charging and discharging of the capacitor. In the preferred embodiment, it is desirable that the metal be one easily evaporated and readily depositable by vacuum deposition techniques. Those metals readily deposited by vacuum evaporation normally have a deposition constant of at least $5 \times 10^{-6}$ grams per cm.$^2$ per second at 1 micron pressure (absolute) such as for example silver, gold, aluminum, lead, chromium, nickel, copper, tin, iron and platinum and thus are most effectively employed as conductive films in these elements.

Thus as employed herein, the term "conductive metal layer" or "conductive metal surface" is meant to encompass any metal surface sufficiently conductive to permit electrical charges to be substantially equally distributed over substantially all areas of the layer or surface. Thus any self-supporting foil or metal sheet, or even a vapor-deposited metal film is contemplated.

The unique results obtained with the capacitors of the present invention are due to the even deposition of the reactive p-xylylene diradial into a smooth pin-hole free polymer coating integrally bonded to the substrate. The poly-p-xylylenes are insoluble in every known organic solvent at room temperatures and are tough, moisture-resistant and impermeable to most gases and vapors. They possess a stable temperature coefficient of capacitance which is independent of the temperature and yet remain tough and flexible at extremely low temperature, thus permitting these capacitors to be employed in high speed switching circuits and super-conductor units. Experiments conducted at temperatures of liquid nitrogen ($-196°$ C.) have established that the polymer is quite resistant to breakage of flexing and that a metal foil backing member is more susceptible to fracture than is the polymer. Flexing does not separate the integral coating of the poly(p-xylylene) from the metal.

In other properties, these poly(p-xylylenes) are highly desirable for the capacitors of this invention. In essence they deposit on a metal substrate much like moisture in a humid atmosphere, but unlike moisture, will have no tendency to flow or collect in heavier masses at the lowest point of the substrate. Thus practically, the polymer deposition gives a smooth even coating to all exposed substrate surfaces. As hereinafter set forth, the substrate should be cool or at least below the condensation temperature of the particular vaporous p-xylylene diradical.

As employed herein, the term "p-xylylene diradical" is intended to encompass the chemical compounds having one free radical site on each of two alpha atoms attached in para position to an aromatic nuclei, such as is represented by the structure

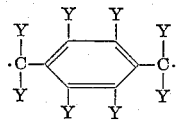

(Formula I)

in which Y can represent any inert monovalent group, as hereinafter more fully described. These p-xylylene diradicals are stable in the vaporous state but will condense into thin void free film of a solid polymer, termed herein "poly(p-xylylene)" which can be characterized by the structure

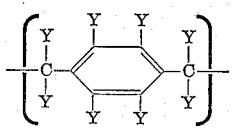

(Formula II)

also more fully described hereinafter.

These polymers are unique for dielectric films for capacitors not only because of their usage as thin films but because of other outstanding properties. While most dielectric materials suffer from a low maximum operating temperature, the poly(p-xylylenes) have quite a broad range of use temperatures. For example, samples of capacitors made using the poly(p-xylylene) as a dielectric between two conductive metal surfaces have exhibited only a 3.5 percent change in capacitance after being stored at 150° C. for 250 hours in air with a 180 volt direct current bias. Storage in vacuum or in inert atmospheres show practically no change in equivalent storage at 175° C. In other respects, these poly(p-xylylenes) are highly desirable in comparison with other dielectrics. Comparison of the discovered dielectric properties of these polymers with other conventional dielectric polymer films is summarized in the Table A following.

TABLE A

| Material | Maximum operating temperature,° C. | Minimum useful thickness | Dielectric constant K |
|---|---|---|---|
| Poly(p-xylylene) | >175 | 100 A | 2.7 |
| Poly(2-chloro-p-xylylene) | >175 | 100 A | 3.0 |
| Poly($\alpha,\alpha,\alpha',\alpha'$-tetrafluoro-p-xylylene). | >300 | 100 A | 2.6 |
| Polyethylene terephthalate | 135 | 6$\mu$ | 3.2 |
| Polytetrafluoroethylene | 200 | 12$\mu$ | 2.1 |
| Polystyrene | 60-70 | 10$\mu$ | 2.5 |
| Polyethylene (irradiated) | 85 | 40$\mu$ | 2.25 |
| Bisphenol A polycarbonate | 125 | 20$\mu$ | |

| Material | Temperature coeff. of capac., p.p.m./°C. | Dissipation factor at 1 kc. | Dielectric strength, volts/cm. |
|---|---|---|---|
| Poly(p-xylylene) | −250 to 100° C | 0.0005 at 100° C. 0.0005 at 20° C. | >5×10⁵ |
| Poly(2-chloro-p-xylylene) | +500 to 100° C | 0.0025 at 100° C. 0.0025 at 20° C. | >5×10⁵ |
| Poly($\alpha,\alpha,\alpha',\alpha'$-tetrafluoro-p-xylylene. | | 0.002 at 20° C. | |
| Polyethylene terephthalate | +250 to 80° C | 0.004 at 20° C. | 1-2×10⁵ |
| Polytetrafluoroethylene | −200 to 120° C | 0.0005 at 20° C. | 2×10⁵ |
| Polystyrene | −150 to 60° C | 0.0005 at 20° C. | 2−2.8×10⁵ |
| Polyethylene | −500 to 85° C | 0.0003 at 20° C. | |
| Bisphenol A polycarbonate | −200 to 120° C | 0.001 at 20° C. | |

Thus, in addition to the above recited low temperature properties, the favorable dielectric constant and high dielectric strength of these poly(p-xylylenes) make them uniquely adapted for thin film capacitors.

Inasmuch as the poly(p-xylylenes) deposit in pin-hole free films in thicknesses as low as 100 A., capacitors made therefrom benefit from the extremely high capacitance achieved thereby. Since capacitance is in a direct relation with the dielectric constant and the area and in inverse relation to the thickness of the dielectric, the extremely thin dielectric of poly(p-xlylene) can greatly increase the capacitance of a given area capacitor, or conversely, substantially reduce the area of capacitor required to secure a given capacitance.

While dielectric thickness of only about 100 A. will naturally have a low breakdown voltage, such capacitors can be employed in microminiaturized circuits where low signal voltages are common. When higher signal voltages are incurred, greater thickness of the poly-p-xylylene may be required. Inasmuch as the p-xylylene vaporous diradicals deposit the poly-p-xylylene free of voids and as one complete layer, no difficulty is secured in obtaining any desired thickness of poly-p-xylylene dielectric.

The poly(p-xylylenes) employed in this invention are secured by the condensation of vaporous diradicals having the Formula I set forth above. These diradicals are quite stable in the vapor phase at temperatures above 200°–250° C. Upon cooling the diradicals condense and immediately polymerize into the linear polymer of Formula II. Each different diradical tends to have its separate condensation temperature generally ranging from about 25° C. to about 250° C. or slightly above depending to a degree on the ambient pressure of the system.

These diradicals can be made by either of several techniques. The method found most convenient and preferred is by the pyrolysis at temperature between 450° C. and 700° C. of at least one cyclic dimer represented generally by the structure

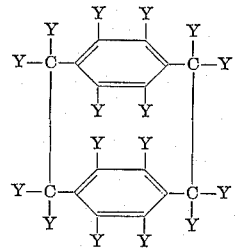

wherein Y is any monovalent inert substituent group, preferably hydrogen, although on the aromatic nucleus, it can be any inert substituent group when starting with this dimer. On pyrolysis. the dimer cleaves into two separate reactive vaporous diradicals each having the structure:

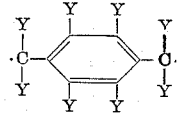

Thus, where all the Y groups are hydrogen, or where the nuclear substituent on each diradical is the same, two moles of the same p-xylylene diradical are formed, and when condensed yield a substituted or unsubstituted p-xylylene homopolymer. When the aromatic nuclear substituent Y groups on each diradical are different, two different diradicals are formed, condensation of which will yield copolymers as hereinafter set forth.

Alpha substituted p-xylylene diradicals are also prepared by the pyrolysis of any aryl bis-sulfone of the structure:

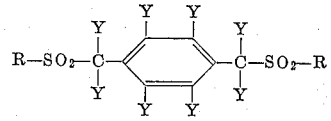

where R is a lower hydrocarbon group, and Y is any nonpolar substituent. These sulfones pyrolyze on heating to temperatures of about 600°–1000° C. into sulfur dioxide and the reactive diradical

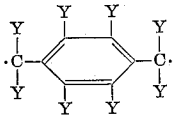

as is disclosed in copending application Ser. No. 232,253 entitled, "Decomposition of Bis-Sulfones," filed Oct. 22, 1962, which is included herewith by reference. This technique is particularly desirable for introducing alpha halo substituent groups in the polymer, outstanding of which is the highly thermal stable poly($\alpha,\alpha,\alpha',\alpha'$-tetrafluoro-p-xylylene).

Reactive diradicals are also prepared by the pyrolysis of a diaryl sulfone of the structure

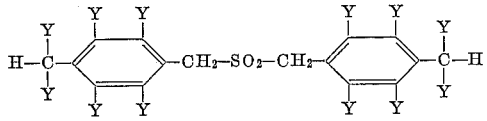

wherein Y is a non-polar substituent. These sulfones pyrolyze on heating to temperatures of about 400°–800° C. into sulfur dioxide and 2 moles of monoradical of the formula

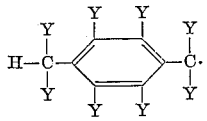

which disproportionates into a p-xylene and a diradical of the structure

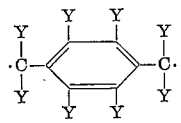

as is disclosed in copending application Ser. No. 232,247 entitled, "Diarylsulfones and Process for the Pyrolysis Thereof to the Corresponding Diarylethanes and Polymers," filed Oct. 22, 1962, which is herewith included by reference.

Any other technique of making the vaporous diradicals can of course be used. Since some of these techniques produce other gaseous by-products (such as SO$_2$) and since certain of the metals employed may be subjected to attack by such by-products, care should obviously be used in selecting the metal to be deposited when employing such reactive diradicals by other diverse means. Since the pyrolysis of the cyclic dimer di-p-xylylene involves no other by-products and the dimer cleaves quantitatively into two moles of the reactive diradical, this method is most preferred.

Inasmuch as the coupling and polymerization of these reactive diradicals upon the condensation of the diradicals does not involve the aromatic ring, any unsubstituted or desired substituted p-xylene polymer can be prepared since the substituent groups function essentially as an inert group. Thus, the substituent group can be any organic or inorganic group which can normally be substituted on an aromatic nuclei or on the aliphatic α carbon atoms of such a diradical.

Notable among the monovalent inert groups that have been placed on the aromatic nuclei or aliphatic α carbon atoms of such poly(p-xylylenes) other than hydrogen are the halogens including chlorine, bromine, iodine and fluorine, alkyl groups such as methyl, ethyl, propyl, butyl and hexyl, cyano, phenyl, amine, nitro, carboxyl, benzyl and other similar groups. While some of the above groups are potentially reactive in certain conditions or with certain reactive materials, they are unreactive under the conditions of the present invention and hence are truly inert in the instant case.

However, since the polymer serves here as a dielectric medium and many of the above substituted poly(p-xylylenes) will have a noticeable or appreciable dipole moment, they do not all provide equal and equivalent results in capacitors. The dissipation factor of certain of the poly(p-xylylenes) having highly polar substituent groups may be higher than that which can be tolerated for certain specific end uses. However for other uses, high dissipation factor may not be objectionable or could possibly be a desired function of the specific capacitor, since these substituted poly(p-xylylenes) often have a higher dielectric constant than does the unsubstituted polymer.

It may also be evident that certain physical attributes of the specific poly(p-xylylene) may be so desirable that the dielectric properties may be acceptable or tolerated. Poly(2-chloro-p-xylylene) for example, is a very tough polymer having certain mechanical benefits over other poly(p-xylylenes). Also poly ($\alpha,\alpha,\alpha',\alpha'$ - tetrafluoro-p-xylylene) is highly temperature resistant and can even tolerate exposure of 300° C. for 100 hours without any change in physical strength. Of the substituted poly(p-xylylenes) these two are preferred. Normally however, for most general applications, the unsubstituted p-xylylene diradical is preferred for use in the present invention i.e. where all Y substituents are hydrogen, as the polymer made from it possesses the most stable electrical properties and the most desirable dielectric constant and power factor of all these polymers.

The substituted di-p-xylylenes and the aryl sulfones from which these reactive diradicals are prepared, can be prepared by techniques common to most organic chemists. For example, the cyclic dimer, di-p-xylylene, is readily susceptible to halogenation, alkylation and/or oxidation and reduction techniques and like methods of introduction of such substituent groups into aromatic nuclei. Inasmuch as the cyclic dimer is a very stable product up to temperatures of about 400° C., elevated temperature reactions can also be employed for the preparation of various substituted materials. Hereinafter the term "di-p-xylylene" refers to any substituted or unsubstituted cyclic di-p-xylylene as hereinabove discussed, and the term "p-xylylene diradical" refers to any substituted or unsubstituted p-xylylene structure having two free radicals on the alpha carbon atoms as hereinabove discussed.

In the polymerization process, the vaporous diridicals condense and polymerize nearly instantaneously at the condensation temperature of the diradicals. The coupling of these diradicals involves such low activation energy and the chain propagation shows little or no preference as to the particular diradical, so that steric and electronic effects are not important as they are in vinyl polymerization. The substituted and/or unsubstituted p-xylylene homopolymers can be made by cooling the vaporous diradical down to any temperature below the condensation temperature of the diradical. It has been observed that for each diradical species, there is a definite ceiling condensation temperature above which the diradical essentially will not condense and polymerize. All observed ceilings of substituted p-xylylene diradicals have been below about 200° C. but vary to some degree upon the operating pressure involved. For example, at 0.5 mm., Hg pressure, the optimum condensation and polymerization temperatures observed for the following diradicals are:

|  | ° C. |
|---|---|
| p-Xylylene | 25–30 |
| Chloro-p-xylylene | 70–80 |
| n-Butyl-p-xylylene | 130–140 |
| Iodo-p-xylylene | 180–200 |
| Dichloro-p-xylylene | 200–250 |
| Tetra - $\alpha,\alpha,\alpha',\alpha'$-fluoro-p-xylene | 35–440 |

Thus, by this process, homopolymer dielectric films are made by maintaining the substrate surface at a temperature below the ceiling condensation temperature of the particular diradical specie involved, or desired in the homopolymer. This is most appropriately termed "homopolymerizing conditions."

Where several different diradicals existing in the pyrolyzed mixture have different vapor pressure and condensation characteristics, as for example p-xylylene and chloro-p-xylylene and dichloro-p-xylylene or any other mixture with other substituted diradicals, homopolymerization will result when the condensation and polymerization temperature is selected to be at or below that temperature where only one of the diradicals condense and polymerize. Thus, for purposes within this application, the terms "under homopolymerization conditions" are intended to include those conditions where only homopolymers are formed. Therefore it is possible to deposit homopolymers from a mixture containing one or more of the substituted diradicals when any other diradicals present have different condensation or vapor pressure characteristics, and wherein only one diradical specie is condensed and polymerized on the substrate surface. Of course, other diradical species not condensed on the substrate surface can be drawn through the apparatus as hereinafter described, in vaporous form to be condensed and polymerized in a subsequent cold trap.

Inasmuch as unsubstituted p-xylene diradicals, for example, are condensed at temperatures about 25° to 30° C., which is much lower than chloro p-xylylene diradicals, i.e., about 70° to 80° C. it is possible to have present such diradicals in the vaporous pyrolyzed mixture along with the chlorine-substituted diradicals. In such a case, homopolymerizing conditions are secured by maintaining the substrate surface at a temperature below the ceiling condensation temperature of the substituted p-xylylene but above that of the p-xylylene, thus permitting the p-xylylene vapors to pass through the apparatus without condensing and polymerizing but collecting the poly-p-xylylene in a subsequent cold trap.

It is also possible to obtain substituted copolymers through the pyrolysis process hereinabove described. Copolymers of p-xylylene and substituted p-xylylene diradicals, as well as copolymers of different substituted p-xylylene diradicals wherein the substituted groups are all the same but each diradical containing a differing number of substituent groups can all be obtained through said pyrolysis process.

Copolymerization occurs simultaneously with condensation upon cooling of the vaporous mixture of reactive diradicals to a temperature below 200° C. under polymerization conditions.

Copolymers can be made by maintaining the substrate surface at a temperature below the ceiling condensation temperature of the lowest boiling diradical desired in the copolymer, such as at room temperature or below. This is considered "copolymerizing conditions," since at least two of the diradicals will condense and copolymerize in a random copolymer at such temperature.

In the pyrolytic process of a di-p-xylylene the reactive diradicals are prepared by pyrolyzing the substituted and/or unsubstituted di-para-xylylene at a temperature between about 450° C. and about 700° C., and preferably at a temperature between about 550° C. to about 600° C. At such temperatures, essentially quantitative yields of the reactive diradical are secured. Pyrolysis of the starting di-p-xylylene begins at about 450°–550° C. but such temperatures serve only to increase time of reaction and lessen the yield of polymer secured. At temperatures above about 700° C., cleavage of the substituent group can occur, resulting in a tri-/or polyfunctional species causing cross-linking and highly branched polymers.

Pyrolysis temperature is essentially independent of the operating pressure. It is, however, necessary that reduced or subatmospheric pressures be employed for successful deposition in the same chamber or system with the metal. For most operations, pressures within the range of 0.01 micron to 10 mm. Hg are most practical for pyrolysis. Likewise if desirable, inert vaporous diluents such as nitrogen, argon, carbon dioxide, helium and the like can be employed to vary the optimum temperature of operation or to change the total effective pressure in the system.

Operating pressure in the system for successful deposition of the metal vapor and the p-xylylene diradicals in the same system depends of course on the particular metals selected. As expected, the metals evaporating at lower temperatures are most easily employed in this process, i.e. those having an evaporation temperature of less than 1200° C. at 10 microns pressure. However, with adequate precautions and equipment it is possible to vaporize any metal by this technique.

It is contemplated in this invention to employ these thin film capacitors in applications of many sorts. For example, it is possible for self-supporting capacitor films to be wound up in a coil or roll similar to the present method of making capacitors. For such applications, it is desirable to first coat a substrate with an insulative layer of the polymer before depositing the metal film. After sufficient thickness of metal is built up the steps can be repeated so as to build up this film by alternative deposition of polymer and metal. This film can be employed as a planar capacitor, or it can be stripped off the substrate and wound up into a coil or roll and leads attached to the various ends. Thin films of 0.05–0.1 mils can easily be handled in this manner, as can of course much thicker films.

It is also contemplated to employ these thin films on a metallic foil or wire substrate by coating the metal substrate completely with a coating of the poly(p-xylylene) and then with a conductive metal vapor deposited film. The thus formed laminate can then be used as a planar capacitor or it can be wound in the conventional manner and used as a rolled capacitor. Preferably, the single element rolled capacitor consists of a complete envelopment of poly(p-xylylene) about a metal foil which is then vacuum metallized (on both sides) except for a narrow margin along one edge of the coated foil. After rolling, one end of the cylindrical unit will present the thin metallized coating, the other end only of polymer coated foil which is cut to bare the metal foil. The two electrode surfaces are then connected to wire leads by spray soldering or by the use of conductive glues, paints or resins. If desired, the completed capacitor can itself be encapsulated with a final coating of poly(p-xylylene) by the same technique of vapor deposition of the reactive diradical. Of course wax, epoxy resins or other materials, including even metal containers can also be used to encapsulate and/or mechanically protect the thus formed capacitors.

The capacitor made this way has the advantage that the capacitance is the same whether the capacitor is planar or rolled up since the insulative poly(p-xylylene) film is firmly and contiguously bonded to the one metallic substrate and the vapor deposited metal film is firmly bonded to the poly(p-xylylene). Thus, even in rolled form, there is no chance for air pockets in the dielectric area between the electrodes or any chance for contaminants or moisture to penetrate the dielectric field and thus change the capacitance or short the capacitor. Also loosening or tightening of the roll will not affect the capacitance. In fact the capacitance of the element can be determined before rolling and thus allow for the manufacture of high precision capacitors.

The simplicity of manufacture of such a one element capacitor makes the method readily adaptable to continuous manufacture. Subsequent rolling and production fabrication processes are greatly simplified over the multiple element capacitors and thus are consequently much more economical.

For rolled film capacitors in which no masking is needed with the polymer deposition (i.e. where it is desirable to completely coat the entire substrate with polymer) the presence of a small pressure of inert gas is desirable in providing higher deposition rates. For example, 10 to 20 microns of pressure of argon gas in the deposition chamber greatly increases the deposition rate of the lower condensing diradicals such as p-xylylene diradical. The effect of the inert gas decreases with the use of the higher temperature condensing diradicals such as the chloro-p-xylylene.

It is also contemplated to apply these capacitors to standard integrated circuit boards by the technique disclosed. Masking of pre-printed circuits where the capacitor films are to be laid down only in the specified unmasked areas permits these thin film capacitors to be used in the supported manner (i.e. non self-supporting). These thicker supports provide a greater resistance to mechanical abuse and thus make possible the ultra thin capacitors. In stacked multilayer capacitors where masking is needed to accurately control the deposition area of the polymers and vapor deposited metal, the presence of any inert gas to promote higher deposition rates may not be as desirable as in rolled capacitor applications because of a scattering of the diradical vapors which may impair the masking effect.

Integrated circuits employing these thin film capacitors are employable in high speed switching elements and in memory recording devices, and because of the desirable low temperature properties of the poly(p-xylylenes), are highly desirable for cryogenic applications of such integrated circuits. It is of course possible by intricate masking techniques to lay down layers of either the poly(p-xylyene) or the metal first in preparing such circuits in making intricate thin-film printed circuits having both capacitative elements, conductors, and by simultaneous deposition of metal and polymer secure a resistive element all on the name substrate.

Thus it is obvious that the capacitors can be made by using continuous deposition techniques, and/or using the same or different deposition conditions, if desired. It is not necessarily critical in the practice of this invention to do the deposition of metal in the same chamber as the deposition of the polymer, although such operation is most convenient. Batch or semi-continuous deposition methods may be readily employed.

The following examples will serve to illustrate the invention, but should not in any way be considered as a limitation thereof. Unless otherwise indicated, all parts and percentages are by weight.

EXAMPLE I

The equipment employed in this example consisted of a one-piece quartz tube 51 cm. long x 42 mm. I.D. closed at the bottom end, which comprised both the sublimation zone at the bottom and the cleavage zone on top for the pyrolysis of the di-p-xylylene. The sublimation zone heater at the bottom of the tube consisted of 3–150 watt cartridge heaters in parallel connected to a Variac control to regulate the heat in the zone at any selected temperature up to 250° C., as monitored by an iron-constantan thermocouple inserted directly in the dimer charge.

The cleavage zone, 27 cm. long, extended to the top of the quartz tube, 24 cm. from the bottom and consisted of sixteen 0.020″ tantalum wires in parallel, spaced apart by baffle plates to promote a longer dwell time in the cleavage chamber and assure adequate heating of the sublimed dimer to give substantially quantitative cleavage into the reactive diradicals. The cleavage zone temperature could be maintained at any selected temperature up to 700° C. by a variable 2000 watt high current power supply. The tantalum wire heater had a resistance at 25° C. of about 0.1 ohm. Temperature in the cleavage zone was monitored by a chromel-alumel thermocouple. A tantalum heat shield surrounded the outside of the quartz tube over the cleavage zone to reduce radiation to surroundings and promote more even heating in the cleavage zone.

A short quartz tube containing several semi-circular optical baffles was placed over the cleavage zone to decrease the thermal energy of the diradicals and reduce the amount of thermal radiation impinging on the substrate from the cleavage zone.

A manually rotatable mask was placed inside the chamber and above the outlet of the cleavage chamber so as to be rotated over the chamber and cut off the supply of diradicals when desired.

A water-cooled aluminum sheet 6″ x 6″ x 0.010″ thick (strapped to water coils) served as the substrate for the polymer-metal film coating and was located several inches above the cleavage zone. A thermocouple attached to the substrate monitored the substrate temperature.

Metal vaporization is secured by four tungsten filament baskets for holding the metal charge which are located below the aluminum substrate sheet and out of direct line with the cleavage zone-substrate line up so as to not interfere in the coating.

The evaporation and coating equipment described above was all fitted into an 18″ bell jar of a Kinney vacuum evaporator system composed of two mechanical pumps connected through a 6″ oil diffusion pump and a liquid nitrogen vapor trap to the coating chamber. Pressure in the coating zone was measured by four vacuum gauges.

The following typical operating sequence indicates the conditions found to yield the most uniform and continuous poly(p-xylylene) films obtained to date.

The aluminum substrates were degreased in acetone, followed by washing in an Alconox detergent solution, rinsed in boiling distilled water and finally oven dried at 100° C. for thirty minutes. A charge of from 2 to 5 grams of crystallized unsubstituted di-p-xylylene dimer was placed in the sublimation flask and the assembly check procedure was completed. The chamber was evacuated to a pressure of from $1 \times 10^{-4}$ to $5 \times 10^{-6}$ mm. of Hg. During the pump down period, the water cooling system was started to lower the substrate temperature to about 15° C. The cleavage zone was raised to about 650° C. in ten minutes by passing a current of 80 amperes at 20 volts (1600 watts power) through the tantalum wire heater.

When the cleavage zone reached about 600° C., the sublimation heater was turned on. The temperature could be raised to 200° C. (if desired) in thirty minutes. Sublimation of dimer begins at about 80° C., as evidenced by a small pressure rise on the vacuum gauge; and the rate increases as the temperature is further raised, until at 120° C., the pressure reaches about 60 microns. When the supply of dimer is exhausted, the pressure drops sharply back to 1 micron.

At this point the heat to the tungsten filament basket was applied and the aluminum melted and began to evaporate and be deposited on the polymer coated substrate sheet. After the aluminum deposition was complete the system was cooled by a series of purges to room temperature, and the capacitors removed.

Capacitance and dissipation factor measurements were made at 25° C., 6 volts D.C. bias and a measuring signal of 3 volts over a range of frequencies of 1 k.c. to 100 k.c. Leakage current and breakdown voltages were also measured, and are reported in the following Table I: other properties are reported in Table II.

TABLE I.—CAPACITANCE AND DISSIPATION FACTOR MEASUREMENTS

| Experiment Number | Capacitor Area A, cm.$^2$ | Dielectric Thickness t, microns | Capacitance C, μμf. | | Dissipation Factor | | Capacitance per cm.$^2$ at 1 kc., μμf. |
|---|---|---|---|---|---|---|---|
| | | | 1 kc. | 100 kc. | 1 kc. | 100 kc. | |
| 1 | 0.56 | 0.93 | 1,485 | 1,474 | 0.0002 | 0.0002 | 27×10$^2$ |
| 2 | 0.64 | 1.1 | 1,494 | 1,483 | 0.0002 | 0.0002 | 23×10$^2$ |
| 3 | 0.70 | 1.1 | 1,582 | 1,566 | 0.0002 | 0.0002 | 23×10$^2$ |
| 4 | 0.48 | 1.1 | 1,137 | 1,130 | 0.0002 | 0.0002 | 24×10$^2$ |

TABLE II

| Description | Film Thickness, microns | Dielectric Constant | Temp. Coefficient of Capacitance, p.p.m./°C | Diss. Factor 1 kc. to 100 kc. | Dielectric Strength, volts/cm. |
|---|---|---|---|---|---|
| Poly(p-xylylene) film on copper substrate. | 1 (0.04 mils) | *2.7 | −200 up to 105° C | 0.0005 (25 to 100° C.) | 3×10$^6$ |
| Poly(p-xylylene) film on aluminum substrate. | 1 (0.04 mils) | *2.7 | −200 up to 105° C | 0.0002 (25° C.) | 5×10$^5$ |

*Virtually independent of frequency between 60 c.p.s. and 100 kc.

EXAMPLE II

Employing a similar procedure and similar pyrolysis equipment to that described in Example I, a series of bis sulfones having the general structure

wherein R was a methyl, n-propyl, n-pentyl and phenyl group were pyrolyzed and poly(perfluoro-p-xylylene) prepared therefrom. The bis sulfones were prepared in the manner described in copending application Ser. No. 232,253, filed Oct. 22, 1962.

The pyrolysis chamber consisted of a quartz tube (heated by a Hevi-Duty furnace) connected to a deposition chamber consisting of a 3″ diameter glass tube 12 inches long, the walls of which are adaptable for a lining of 0.15 mil aluminum foil which is coated only on one side with the poly(α,α,α′,α′-tetra fluoro-p-xylylene) on the deposition.

Pyrolysis of bis-sulfones under reduced pressure commenced at temperatures about 400° C. Heating under these conditions decomposes the bis-ulfone with the evolution of sulfur dioxide and other gaseous materials resulting in an increase in pressure which returns the initial pressure when the reaction has reached completion. The pyrolysate, upon condensation, polymerized instantaneously to form a clear transparent film which was deposited on the foil of the cooled deposition chamber. The polymer, poly(α,α,α′,α′-tetra fluoro-p-xylylene) is a highly crystalline material possessing a crystalline melting point in excess of 360° C. Its thermal stability is excellent. Heating the polymer at 300° C. in air for 100 hours resulted in no degradation.

Table III summarizes the preparation of poly(α,α,α′,α′-tetra fluoro-p-xylylene) from the bis-sulfones.

were determined on a 1μ film, in the same manner as above reported. Results of tests under various frequencies are reported below in Table IV.

TABLE IV

| | Dielectric Constant | Dissipation Factor |
|---|---|---|
| 60 c.p.s | 2.6–2.7 | 0.0017 |
| 1×10$^3$ c.p.s | 2.55–2.65 | 0.0020 |
| 1×10$^6$ c.p.s | 2.50–2.6 | 0.0037 |

EXAMPLE III

A 3″ I.D. x 18″ long glass coating chamber connected to a diradical generator, and vacuum pumps was employed in this example. The diradical generator consisted of a sublimation zone heated to 180° C. connected to a cleavage or pyrolysis zone operated at 650° C. through a common 1½″ I.D. 35″ Vycor glass tube. The vacuum pump unit consisted of a 5 c.f.m. mechanical pump connected through a 2″ oil diffusion pump and a Dry-Ice trap to the coating chamber. Copper wire leads were sealed into the walls of the coating chamber and were connected inside the chamber to a tungsten filament coil source for evaporation of metal. The indicated metal was placed inside the tungsten coil source before the coating chamber was closed.

Di-p-xylene or the substituted di-p-xylene was placed in a glass tube in the sublimer zone, usually about 5.0 grams was used. The external leads of the tungsten source were connected to the terminals of a current transformer and variac controller and the system evacuated to an ultimate pressure of about 1 micron Hg absolute.

The heat to the pyrolysis zone was turned on until a stable temperature of about 650° C. was reached while the operating pressure was being secured. The tempera- TABLE III.—PREPARATION OF POLY(α,α,α′,α′-TETRAFLUORO-p-XYLYLENE)

| R—SO$_2$—F$_2$C—〈 〉—CF$_2$—SO$_2$—R | Vaporization Temperature, deg. | Pyrolysis Temperature, deg. | Pressure (mm. Hg) during— | | |
|---|---|---|---|---|---|
| | | | Initial | Reaction | Final |
| R=C$_2$H$_5$ | 250 | 700 | 0.1 | 0.3 | 0.1 |
| R=C$_2$H$_5$ | 200 | 650 | 0.05 | 0.3 | 0.03 |
| R=C$_3$H$_7$ | 200 | 700 | 0.1 | 1.2 | 0.1 |
| R=C$_4$H$_9$ | 200 | 700 | 0.1 | 0.8 | 0.1 |
| R=C$_6$H$_5$ | 300 | 700 | 0.05 | 0.4 | 0.05 |
| R=C$_6$H$_5$ | 240 | 800 | 0.02 | 0.5 | 0.02 |

Dielectric properties of a capacitor made from poly-(α,α,α′,α′-tetrafluoro-p-xylylene) having the structure:

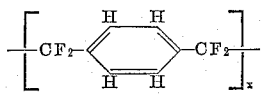

ture in the sublimation zone was then increased to about 180° C. As the dimer vapors went through the pyrolysis zone, they were cleaved quantitatively to the corresponding reactive diradical indicated and were fed to the coating chamber, and the pressure in the coating chamber increased to about 20–100 microns Hg.

The diradicals were condensed on the walls of the coating chamber (maintained at room temperature) and simultaneously polymerized to form a clear tough film on all of the cold walls of the chamber. In order to prevent deposition on the tungsten coil and the metal in it, a small current was kept flowing through this circuit so as to keep its temperature above 250° C.

After sufficient polymer was deposited, the sublimation zone heater was shut off or the dimer completely exhausted, and the current to the tungsten filament coil increased until the metal began to evaporate, as shown by the formation of a mirror on the surface of the previously deposited plastic film.

In a number of experiments listed in Table IV below, additional polymer deposition was made, and in some instances, a further deposition of metal was made. In certain others, metal was deposited first, followed by polymer. As indicated in the table, "P" means polymer and "M" means metal, the latter designations meaning it was deposited over the former. Thus an "P-M-P" indicates a polymer-metal-polymer deposition. In those examples where metal is deposited first, i.e., those designated "M-P" and "M-P-M," it was found desirable to use a silicone mold release agent on the glass walls of the chamber for ease of removal of the films.

In all cases the films, after deposition was complete, were stripped off the walls of the chamber and recovered intact as essentially a tube of the polymer-metal laminate. In Example 20, the polymer-metal coating was deposited on an aluminum foil coupon 1″ x 4″ for better contact for evaluation of its capacitative values. The unmetalized layer of poly(chloro-p-xylylene) on the back of the foil was stripped off and the coupon evaluated as a capacitor and had the following properties.

Deposited polymer layer — 0.3 mil poly(chloro-p-xylylene).
Deposited aluminum layer—about .1μ.

capacitance—0.0119μfd.
dielectric constant—3.0
breakdown voltage—835 volts/mil (r.m.s.)
Δt, capacitance—+9% per 50° C.
power factor—4%

Other samples were of similar properties.

TABLE V

| Example | Diradical Used | Metal | Structure Produced |
|---|---|---|---|
| 5 | Chloro-p-xylylene | Al | P-M. |
| 6 | do | Al | P-M-P. |
| 7 | do | Al | M-P. |
| 8 | do | Al | M-P-M-P. |
| 9 | do | Zn | P-M-P. |
| 10 | do | Cu | M-P. |
| 11 | do | Mg | P-M-P. |
| 12 | do | Si | M-P. |
| 13 | do | Al | M-P-M. |
| 14 | do | Al | M-P-M. |
| 15 | do | Pb | M-P-M. |
| 16 | do | Ge | M-P. |
| 17 | Dichloro-p-xylylene | Ge | P-M-P. |
| 18 | do | Mg | M-P. |
| 19 | Chloro-p-xylylene | Al | M-P-M. |
| 20 | do | Al | P-M.* |
| 21 | do | Ag | M-P. |

*Deposited on aluminum coupon.

EXAMPLE IV

In a glass coating chamber, 6 inches in diameter and 4 feet long, fitted with the same type sublimation and pyrolysis zones and vacuum pumps as described in Example III for coating by diradical condensation and polymerization. Aluminum foil strips (0.55 mil thick) 1 inch wide and 6–7 feet long was suspended in the chamber by clips so as to prevent the film from contacting the coating chamber walls.

Depending on the coating thickness desired, 2, 3, 5 or 6 grams of di-p-xylylene or the appropriate substiuted di-p-xylylene was place in the sublimation chamber so as to yield respectively, coatings of 0.075, 0.1, 0.15 or 0.19 mils of polymer coating on the foil. The procedure as set forth in Example II was followed for the coatings.

The samples of foils were tightly wound into rolled capacitors on a manually powered mandrel wrapping device to make a tight rolled capacitor about 1 inch long and ¼ inches in diameter. Two strips of the polymer coated aluminum foil were placed together, each of which was connected to leads for the determination of capacitance, dissipation and leakage current as shown in Tables VI and VII.

Capacitance and dissipation factor in Table VI was measured at a frequency of 60 c.p.s. with a 20 volt D.C. bias. All measurements were made at 25° C. The theoretical capacitance shown in Table VI was calculated from the known area and dielectric constant of 2.8 for the unsubstituted poly-p-xylylene and 3.0 for both the poly(chloro-p-xylylene) and the chlorodichloro p-xylylene copolymer. In Table VI, those examples marked with a subscript "p" were planar capacitors made from the coated foil by depositing a conductive film through a mask of an area of 2.0 square centimeters for comparison with the rolled capaictors.

TABLE VI

| Sample | Thickness (mils) | Area (cm.²) | Capacitance (μf.) Measured | Dissipation Factor |
|---|---|---|---|---|
| A—Poly(p-xylylene) | .70 | 116.0 | .015 | 0.13 |
| A$_p$—Poly(p-xylylene) | .35 | 2.0 | .00162 | |
| B—Poly(chloro-p-xylylene) | .40 | 123.0 | .031 | |
| B$_p$—Poly(chloro-p-xylylene) | .20 | 2.0 | .00128 | |
| C—Poly(p-xylylene) | .38 | 126.0 | .039 | .02 |
| D—Poly(p-xylylene) | .54 | 116.0 | .022 | .02 |
| D$_p$—Poly(p-xylylene) | .27 | 2.0 | .00084 | .08 |
| E—Poly(p-xylylene) | .30 | 132.0 | .031 | .02 |
| E$_p$—Poly(p-xylylene) | .15 | 2.0 | .00156 | |
| F—Poly(p-xylylene) | .20 | 116.0 | .030 | 0.02 |
| F$_p$—Poly(p-xylylene) | .10 | 2.0 | .00194 | |
| G—Chloro-dichloro-p-xylylene copolymer(9 to 1 ratio) | .26 | 116.0 | .021 | |
| G$_p$—Chloro-dichloro-p-xylylene copolymer(9 to 1 ratio) | .13 | 2.0 | .00077 | |

What is claimed is:

1. A capacitor adapted to retain and store an electrical charge comprising an alternate laminate of at least two electrically conductive metal layers separated and electrically isolated from each other by a vapor deposited void free, linear poly(p-xylylene) film applied to the metal layer by the condensation thereon of vaporous reactive p-xylylene diradicals having the structure

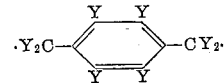

wherein Y is an inert monovalent substituent, at temperatures below the condensation temperature of the diradical, said film at least 100 A. units thick and being integrally bonded to at least one of said conductive metal layers.

2. A capacitor as described in claim 1 wherein at least one of the metal layers is a vapor deposited metal layer at least about 100 A. units thick.

3. A capacitor as described in claim 1 wherein at least one of the metal layers is a solid self-supporting metal foil.

4. A capacitor as described in claim 3 wherein a second metal layer is a vapor deposited metal layer at least 100 A. units thick.

5. A capacitor as described in claim 3 wherein the poly(p-xylylene) dielectric film is between 500 and 5000 A. units thick.

6. A stacked thin film capacitor comprising a plurality of alternating laminates of a metal conductive layer having integrally bonded thereto a vapor deposited void free linear poly(p-xylylene) film applied to the metal layer by the condensation thereon of vaporous reactive p-xylylene diradicals having the structure

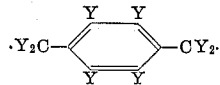

wherein Y is an inert monovalent substituent, at temperatures below the condensation temperature of the diradical, said film at least 100 A. units thick, in which each of said metal conductive layers is electrically isolated from the next adjacent metal layer by said poly(p-xylylene) film and in which alternating conductive metal layers are connected to the same terminal lead of the capacitor.

7. A rolled film capacitor comprising a laminated element comprising a self-supporting conductive metal foil having integrally bonded thereto, a vapor deposited void free linear poly(p-xylylene) film applied to the metal layer by the condensation thereon of vaporous reactive p-xylylene diradicals having the structure

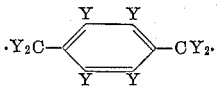

wherein Y is an inert monovalent substituent, at temperatures below the condensation temperature of the diradical, said film at least 100 A. units thick and superposed thereon an electrically conductive vapor deposited metal layer at least 100 A. units thick and electrically isolated from the said metal foil, said laminated element being wound in a cylindrical roll and having two separated leads attached respectively to the conductive metal foil and to the vapor deposited metal layer.

8. A rolled film capacitor as described in claim 7 wherein the poly(p-xylylene) dielectric film is between 500 and 20,000 A. units thick.

9. A rolled film capacitor comprising as one electrode thereof a laminated element comprising a self-supporting conductive metal foil having integrally bonded thereto a vapor deposited void free linear poly(p-xylylene) film applied to the metal layer by the condensation thereon of vaporous reactive p-xylylene diradicals having the structure

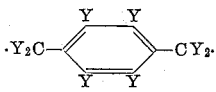

wherein Y is an inert monovalent substituent, at temperatures below the condensation temperature of the diradical, said film at least 100 A. units thick and as a second electrode thereof, a second self-supporting conductive metal foil, said laminated element and second metal foil being wound in a cylindrical roll and having two separated leads attached respectively to the two conductive metal foils.

10. A rolled film capacitor comprising first and second self-supporting conductive metal foils each having integrally bonded over the surfaces thereof vapor deposited void free, linear poly(p-xylylene) dielectric films applied to the metal foils by the condensation thereon of vaporous reactive p-xylylene diradicals having the structure

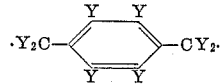

wherein Y is an inert monovalent substituent, at temperatures below the condensation temperature of the diradical, said films being at least 100 A. thick, said first and second dielectric coated foils being wound in a cylindrical roll whereby the first and second conductive metal foils are separated from each other by two films of the dielectric, and two separate leads attached respectively to the two conductive metal foils.

11. A rolled capacitor as in claim 10 in which each poly(p-xylylene) film is about 20,000 A. in thickness.

12. A rolled capacitor comprising a laminated element comprising a self supporting insulative substrate having formed on at least one side thereof a first vapor deposited conductive metal film, a vapor deposited void free, linear poly(p-xylylene) film applied to the first metal film by the condensation thereon of vaporous reactive p-xylylene diradicals having the structure

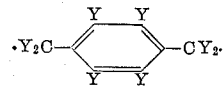

wherein Y is an inert monovalent substituent, at temperatures below the condensation temperature of the diradical, said film being at least 100 A. thick, and a second conductive metal film vapor deposited on the void free, linear poly(p-xylylene) film, said laminated element being wound in a cylindrical roll, and separate leads attached respectively to the first and second metal films.

13. The rolled capacitor of claim 12 in which the laminated element has a plurality of vapor deposited metal films and vapor deposited void free, linear poly-(p-xylylene) films separating said metal films and integrally bonded thereto with alternating conductive metal films connected to one lead of the capacitor, the other conductive metal films being connected to the other lead of the capacitor.

References Cited by the Examiner

UNITED STATES PATENTS 2,785,090  3/1957  Kirk.
2,886,749  4/1959  McMahon _____ 317—258
3,211,973  10/1965  Ferrante _____ 317—260

FOREIGN PATENTS 475,654  11/1937  Great Britain.

LEWIS H. MYERS, *Primary Examiner.*

E. GOLDBERG, *Assistant Examiner.*